O. A. DENNIS.
Coin-Package.
No. 8,769. Reissued June 24, 1879.
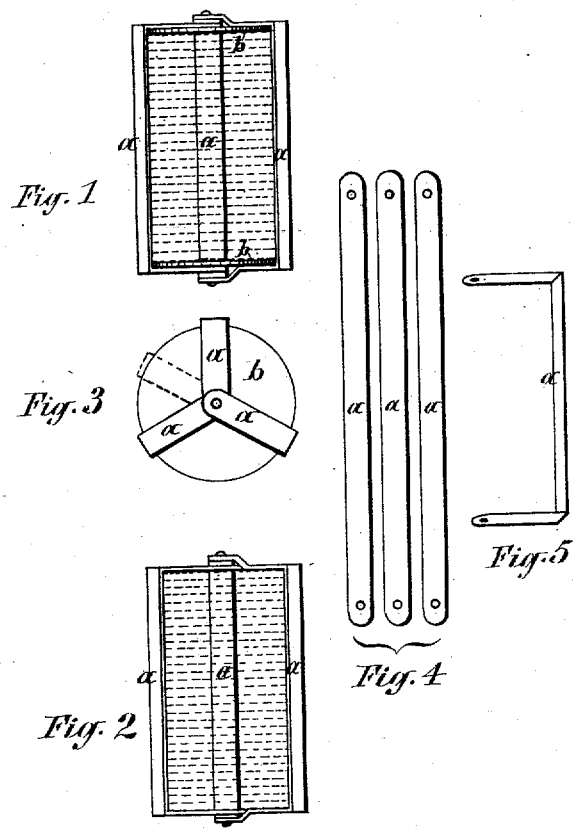
WITNESSES:
George W. Hey
C. Bendixen.
INVENTOR:
Oscar A. Dennis
per E. Lucas, Atty.
N. PETERS, PHOTO-LITHOGRAPHER, WASHINGTON, D. C.

UNITED STATES PATENT OFFICE.

OSCAR A. DENNIS, OF SYRACUSE, NEW YORK.

IMPROVEMENT IN COIN-PACKAGES.

Specification forming part of Letters Patent No. 211,321, dated January 14, 1879; Reissue No. 8,769, dated June 24, 1879; application filed May 12, 1879.

*To all whom it may concern:*

Be it known that I, OSCAR A. DENNIS, of the city of Syracuse, in the State of New York, have invented new and useful Improvements in Coin-Packages, of which the following, taken in connection with the accompanying drawings, is a full, clear, and exact description.

My invention relates to improvements in that class of coin-holders which receive the coin between two longitudinal bars and right-angled arms extended therefrom, and confine the coin in the receptacle thus formed by an adjustable swinging bar pivoted to the arms of the aforesaid receptacle.

The object of my invention is to provide a coin-package which shall be simple and comparatively inexpensive in construction, capable of being opened and closed at any point of its circumference, and of having its confining-bars equidistantly distributed around the coins, and thus hold the same securely without the aid of an extra catch or locking device.

To that end my improvement consists, essentially, of a coin-holder constructed of a series of separate and distinct strips or bands, bent at right angles near their ends, and pivoted to each other at their extremities, so as to allow each band to swing independent of the others.

It also consists in the combination of circular end plates and a series of separate and distinct strips or bands of metal or other suitable material, bent at right angles and pivoted at their extremities to the said circular end plates, all as hereinafter more fully described.

The invention is clearly illustrated in the accompanying drawings, wherein Figures 1 and 2 are side views of the coin-package with and without the circular end plates, respectively. Fig. 3 is an end view of that shown in Fig. 1, and Figs. 4 and 5 are detail views of the invention.

Similar letters of reference indicate corresponding parts.

*a a* represent the ties or bands between which the coin is confined, and which constitute the principal element of my invention. They are formed of strips of metal or other suitable material, of a shape similar to that shown in Fig. 4 of the drawings, by bending the ends thereof at right angles, as illustrated in Fig. 5 of the drawings. The bands thus bent are then pivoted to each other at their respective extremities, so as to allow each of them to swing on its pivot independent of the others, and thus admit of inserting or extracting the coins at any point of the circumference of the package, and also allow the said bands to be placed equidistant apart around the package.

By pivoting the bands *a a a* to circular heads or end plates, *b b*, as shown in Fig. 1 of the drawings, the ends of the bands are braced, and the empty package is better maintained in proper shape.

I am aware that coin-holders have been constructed of a rigid skeleton-frame, constituting the main portion or body of the holder, and a single swinging clamp-bar pivoted to said frame, for confining the coins therein; but such construction does not accomplish the object of my invention, inasmuch as it is expensive, furnishes only one means of opening and closing the package, and at only one point of its circumference, is liable to become inoperative by the cramping, binding, or other injury to the single swinging bar, and does not admit of distributing the confining-bars equidistantly around the coins, and therefore does not afford the requisite security against self-opening of the package without the aid of an extra catch or locking device; hence I do not claim such construction.

What I do claim as my invention, and desire to secure by Letters Patent, is—

1. A coin-package constructed of the bands *a a a*, bent at right angles and pivoted to each other at their extremities, so as to allow each band to swing independent of the others, substantially as described and shown.

2. A coin-package constructed of circular heads or end pieces, *b b*, and longitudinal bands *a a a*, bent near their ends and pivoted to the said heads, so as to allow each band to swing on the pivot irrespective of the others, substantially as described, for the purpose set forth.

OSCAR A. DENNIS.

Witnesses:

GEORGE W. HEY,

C. BENDIXEN.